US005225087A

United States Patent [19]

Kardos

[11] Patent Number: 5,225,087

[45] Date of Patent: Jul. 6, 1993

[54] RECOVERY OF EDTA FROM STEAM GENERATOR CLEANING SOLUTIONS

[75] Inventor: Zoltan L. Kardos, Chalfont Boro, Allegheny Co., Pa.

[73] Assignee: Westinghouse Electric Corp., Pittsburgh, Pa.

[21] Appl. No.: 698,502

[22] Filed: May 10, 1991

[51] Int. Cl.[5] .................... C02F 1/62

[52] U.S. Cl. .................... 210/713; 210/724; 210/726; 210/737; 210/912; 134/10; 134/13; 423/2; 423/11; 252/631

[58] Field of Search .................... 210/724, 726, 912, 711, 210/688, 665, 682, 681, 751, 712, 739, 766, 73; 423/2, 3, 11; 134/10, 13; 252/631

[56] References Cited

U.S. PATENT DOCUMENTS

| | | | |
|---|---|---|---|
| 3,330,771 | 7/1967 | Komatsu et al. . | |
| 3,506,576 | 4/1970 | Teumac . | |
| 4,329,224 | 5/1982 | Kim | 210/912 |
| 4,409,119 | 10/1983 | Burger et al. | 252/156 |
| 4,524,001 | 6/1985 | Joubert | 210/713 |
| 4,632,705 | 12/1986 | Baum | 134/3 |
| 4,654,200 | 3/1987 | Nirdosh et al. | 423/2 |
| 4,681,705 | 7/1987 | Robertson | 252/631 |
| 4,693,833 | 9/1987 | Toshikuni et al. | 210/759 |

OTHER PUBLICATIONS

EPRI NP-6356-M, Final Report, "Qualification of PWR Steam Generator Chemical Cleaning for Indian Point-2", May 1989.

*Primary Examiner*—Peter Hruskoci
*Assistant Examiner*—Neil M. McCarthy

[57] ABSTRACT

A process for recovering the chelating or complexing agents, particularly ethylenediaminetetraacetic (EDTA), used in chemical cleaning and decontamination operations performed to clean steam generators, especially nuclear powered steam generators, is provided. The EDTA, metal and radionuclide-containing aqueous waste stream is, optionally, first treated to remove the metals and radionuclides. The pH of the resulting liquor is then adjusted to less than 2.0, causing the precipitation of acid EDTA. The solid acid EDTA is recovered for reuse or disposal, as desired. The remaining liquid is treated as required to permit environmental disposal. Removal of the metals and radionuclides can be by sulfide precipitation or ion exchange and may be conducted before or after precipitation of the acid EDTA.

13 Claims, No Drawings

RECOVERY OF EDTA FROM STEAM GENERATOR CLEANING SOLUTIONS

FIELD OF THE INVENTION

The present invention is directed generally to the chemical decontamination of steam generators and specifically to the separation and recovery of steam generator contaminants and decontamination reagents.

BACKGROUND OF THE INVENTION

Steam generators, both those that are nuclear powered and those that are fired by other power sources, are subject to the build-up of sludge which may form concentration sites for contaminating chemical impurities adjacent to the steam generating structures in the generator. These contaminants, which include, for example, chlorides, sulfides and caustics, may become sufficiently concentrated to damage the steam generator tubes. Consequently, the generator must be cleaned periodically to prevent the concentration of corrosion-causing chemical contaminants in the steam generator and the resulting corrosion of generator components.

One well-known steam generator cleaning process is a two-step chemical descaling process based on the dissolution and chelation of iron and copper, which are the major components in a copper-bearing generator sludge, with ethylenediaminetetraacetic acid (EDTA). Magnetite iron, which includes both $Fe^{+3}$ and $Fe^{+2}$, reacts with EDTA as follows:

$$Fe_3O_4 \rightleftharpoons Fe_2O_3 + FeO$$

$$Fe^{+3} + EDTA^{-4} \rightleftharpoons FeEDTA^{-}$$

$$Fe^{+2} + EDTA^{-4} \rightleftharpoons FeEDTA^{-2}$$

Copper reacts with EDTA after being oxidized by hydrogen peroxide as follows:

$$Cu + H_2O_2 \rightleftharpoons Cu^{+2} + H_2O + \tfrac{1}{2}O_2$$

$$Cu^{+2} + EDTA^{-4} \rightleftharpoons CuEDTA^{-2}$$

In this process, the temperature of the copper solvent is significantly lower than that of the iron solvent to minimize decomposition of the oxidant and corrosion effects. An initial rinse is followed by an initial solvent exposure, which can be either the copper or iron solvent. The solvent exposure is repeated until analyses performed on samples from the process solution show iron, copper, EDTA and/or hydrogen peroxide levels to be concomitant with desired termination levels. A rinsing step follows, and then a different solvent exposure is performed, except that two rinses are required after the iron solvent to help achieve the 100° F. (37.8° C.) cooldown required before the copper solvent step can be performed. A passivation rinse completes the process to form protective oxide films on the surfaces of steel components.

One difficulty with this process is that the iron cleaning solvent tends to cause corrosion of carbon and low alloy carbon steel generator components. A limited amount of corrosion, however, has been determined to be an acceptable trade-off because of the effectiveness of the cleaning process. Another difficulty presented by the aforementioned chemical descaling process is the disposal of the chelating materials used and generated by the process. These chelating materials are not accepted at low level radioactive waste disposal sites, primarily because of their high EDTA content. In addition, the chelating agents are capable of radioactive metals out of the waste which could end up in ground water.

U.S. Pat. No. 4,632,705 to Baum discloses a process for cleaning deposits from the restricted areas of a steam generator of a nuclear power plant system which overcomes, to a large extent, the corrosion problem by increasing the concentration of an aqueous organic cleaning agent solution in the specific areas to be cleaned by varying the temperature and pressure of the cleaning solution. However, this patent does not suggest processing the cleaning solution to recover the cleaning agent to facilitate its disposal or reuse. Consequently, disposal of the contaminated cleaning solution continues to remain a problem.

U.S. Pat. Nos. 4,681,705 to Robertson and 4,693,833 to Toshikuni et al. both disclose methods of treating radioactive liquids in the course of operating and cleaning nuclear power facilities. U.S. Pat. No. 4,681,705 is specifically directed to the decontamination of mixtures of water and water-immiscible organic liquids, such as contaminated reactor lubricating oil. A water-soluble chelating agent, such as EDTA, and, optionally, a water soluble inorganic precipitating agent are used for this purpose. The acidity is adjusted to promote the chelating action desired, which is preferably the removal of Cobalt-60, characteristically the most difficult radionuclide to remove. The optimum pH for the removal of Cobalt-60 is greater than 7, with the best results achieved at a pH of about 10.5. The decontaminated oil is disclosed to be suitable for disposal by burning, while the chelated radionuclide-containing solution is stated to be disposed of by conventional methods. However, no provision is made for recovery or reuse of the chelating agent.

The Toshikuni et al. patent discloses a method of treating radioactive waste water containing organic materials generated during chemical decontamination of nuclear power facilities. This method decomposes the decontaminating agents, which are mainly organic acids, by high efficiency oxidation in the presence of metal ion catalysts. Rapid decomposition of these organic acids occurs at temperatures of 60° to 90° C. with $H_2O_2$ in the presence of copper ions or copper and iron ions. However, this patent is completely silent regarding the disposal of the radioactive components of the waste water or the recovery or disposal of the decontaminating agents.

U.S. Pat. No. 3,506,576 discloses a cleaning solution useful for cleaning ferrous based metal surfaces, such as those of steam boilers, which is an aqueous alkaline solution of a strong chelating agent, for example EDTA, that contains a water soluble sulfide capable of providing sulfide ions. The cleaning solution additionally prevents the deposition of copper on the ferrous metal. However, there is no suggestion that the EDTA present in this cleaning solution could be recovered for reuse following the chemical decontamination of a nuclear-fired steam generator.

The prior art has failed, therefore, to provide a process which produces maximum recovery for reuse of the cleaning components used in the cleaning of steam generators. The prior art has further failed to provide a process for the recovery of nuclear steam generator cleaning agents which allows recovery of the cleaning agents in a form that permits their reuse and which also allows the separation of radioactive components from the cleaning agents in a form acceptable for waste disposal.

SUMMARY OF THE INVENTION

It is a primary object of the present invention, therefore, to overcome the disadvantages of the prior art and to provide a method for recovering reusable cleaning agents from a steam generator cleaning solution which facilitates disposal of the cleaning operation waste.

It is another object of the present invention to provide a method for processing steam generator chemical decontamination solutions which promotes recovery of the decontamination chemicals.

It is an additional object of the present invention to provide a method for recovering chelating or complexing agents used to clean nuclear powered steam generators.

It is yet a further object of the present invention to provide a method for recovering EDTA from a solution used to clean a steam generator in a form suitable for reuse in subsequent steam generator cleaning treatments.

The aforesaid objects are achieved by providing a method for recovering chemical cleaning agents used to decontaminate steam generators wherein the decontaminating or cleaning process employs a chelating agent or complexing agent to form complexes with metals and/or radionuclides in the aqueous generator environment to be cleaned or decontaminated. The chelating or complexing agent-containing liquor resulting from the cleaning process, which has a pH of about 5 to 7, is treated to separate toxic metals and radionuclides for further processing and/or disposal. This may be achieved by the addition of sulfides, by ion exchange or both. The chelating or complexing agent-containing liquor is acidified to a pH of less than about 2 to precipitate the chelating or complexing agent in its acid form. It may then be recovered for reuse.

Further objects and advantages will be apparent from the following description and claims.

DETAILED DESCRIPTION OF THE INVENTION

Currently available chemical cleaning and decontamination processes used to clean nuclear and fired steam generators are typically based on a descaling method which employs a chelating or complexing agent in solution. The chelating or complexing agent forms complexes with the metals present in the portions of the generator being cleaned. Some of these metals are toxic, some are radioactive, and some are neither toxic nor radioactive. However, in this type of chemical decontamination process, the chelating or complexing agent is typically complexed with and/or combined with materials that are classified as toxic, as radioactive, or as both. The disposal of such materials presents problems, primarily because they are in liquid form and are not accepted for disposal at low level radioactive waste disposal sites. Moreover, the extremely large volume of the metal chelate or complex-containing cleaning solution makes the disposal by methods usually used for radioactive liquids impractical. The present invention provides a method whereby these large volumes of toxic and radioactive metal-containing steam generator cleaning solutions may be safely disposed of in accordance with applicable legal requirements. The present invention additionally provides a method for recovering complexing or chelating agents in which they can be reused in subsequent chemical cleaning operations. Further, the large volumes of water typically required to perform the generator cleaning process can be easily treated to remove any remaining traces of hazardous components and then discharged into the environment.

The present invention is most advantageously employed following chemical cleaning, decontamination or descaling operations used to clean steam generators. Although the preferred application of the present method is in connection with a nuclear steam generator, it may also be effectively used in connection with the cleaning of a non-nuclear fired steam generator.

Steam generators used in conjunction with nuclear reactors experience the build up of sludge, which includes corrosion products from the steam generator and associated structures and contaminants from the makeup water and condenser in leakage. The removal of this sludge is typically accomplished by a combination of mechanical and chemical cleaning techniques. One widely used steam generator chemical cleaning process is a multi-step process developed by the Electric Power Research Institute (EPRI) and the Steam Generator Operators Group (SGOG). This process is a two-step process which focuses on the dissolution and chelation of iron and copper with ethylenediaminetetraacetic acid (EDTA). Both $Fe^{+3}$ and $Fe^{+2}$ species are present in the sludge and react with EDTA as follows:

$$Fe^{+3} + EDTA^{-4} \rightleftarrows FeEDTA^{-}$$

$$Fe^{+2} + EDTA^{-4} \rightleftarrows FeEDTA^{-2}$$

Copper must be oxidized, usually by hydrogen peroxide, before it will react with EDTA:

$$Cu + H_2O_2 \rightleftarrows Cu^{+2} + H_2O + \tfrac{1}{2}O_2$$

$$Cu^{+2} + EDTA^{-4} \rightleftarrows CuEDTA^{-2}$$

Ammonium hydroxide ($NH_4OH$), hydrazine ($N_2H_4$) and other solvents are used to dissolve and rinse the iron and copper during this cleaning process. The various solvent exposures and rinses are conducted at a pH of about 8 to 10.

The present invention is premised on the principle that a chelating or complexing agent, whether in acid form or in salt form, cannot maintain a chemical bond with metal ions below a critical pH. When this critical pH is reached, the metals are released as metal salts in solution. The chelating or complexing agent precipitates as its acid form and can be separated from the rest of the cleaning process waste. The precipitated chelating or complexing agent solid can then be recovered and processed for reuse. Toxic and radioactive metals may be separated from the cleaning solution by known processes, such as sulfide addition, ion exchange, or both. The chelating or complexing agent and metal-free waste water stream is then sufficiently clean to be discharged into the environment.

One chelating/complexing agent commonly used in the chemical cleaning of steam generators is ethylenediaminetetraacetic acid (EDTA). However, the present process can be employed to recover any chelating and/or complexing agent that has a limited solubility in its acid form, but is very soluble in the salt form used in a cleaning or other process. It is anticipated, for example, that nitroloacetic acid (NTA), oxalic acid, succinic acid, and related compounds could also be recovered according to the process of the present invention.

In one embodiment of the present invention, the metal and EDTA-containing liquor resulting from the aforementioned EDTA cleaning process is collected. This liquor typically has a pH of about 5 to 7. Sulfides are added to this liquor to form insoluble metal sulfides with the metals removed from the steam generator during the cleaning process. These metals typically include both toxic metals and radionuclides. The insoluble metal sulfide precipitate thus formed is separated from the liquor. This precipitate may be disposed of without further treatment in accordance with toxic and radioactive metal disposal practices or it may be processed further and recovered.

The EDTA-containing liquor remaining after the metal sulfide precipitate has been removed is acidified to a pH of less than about 2, which causes acid EDTA to precipitate.

The pH of the EDTA-containing liquor is adjusted to a pH within the range of about 0.5 to 2 by the addition of an acid. Precipitation and recovery of the EDTA can be achieved with many different acids. One particular acid may be more desirable than another because of the specific salt formations produced during the conversion-precipitation of the chelating agent. In addition, one acid may require a smaller volume to produce the desired precipitation than another acid. Generally, about 2 to 5 by volume % acid is required to produce a pH in the desired range. Sulfuric acid ($H_2SO_4$), hydrochloric acid (HCl), phosphoric acid ($H_3PO_4$) and nitric acid ($HNO_3$) will all produce significant precipitation of a chelating agent, particularly EDTA, in its acid form (H-acid EDTA).

This precipitation step is preferably conducted when the liquor is chilled to about 32° F. (0° C.) to reduce the solubility of the EDTA, thus enhancing the separation efficiency. For example, at about 70° F. (21.1° C.), the solubility of an EDTA salt is about 10–15%, whereas at about 32° F. (0° C.), the about 0.1 to 0.3% when precipitated as an acid EDTA.

The precipitated acid EDTA is collected and is processed further, as required, for reuse or is disposed of.

The pH of the liquor remaining after removal of the precipitated EDTA is adjusted to about 7. This EDTA-free liquor is then processed further as needed to meet federal and/or state disposal requirements.

In a second embodiment of the present invention, the pH of the liquor remaining after the cleaning process is adjusted from the 5 to 7 range to a pH of less than about 2 to initially precipitate the EDTA as acid EDTA. After the EDTA precipitate has been recovered, the pH of the remaining liquor is adjusted to about 7. Sulfides are then added to precipitate out the metals and radionuclides as insoluble metal sulfides. These metal sulfides can then be separated from the liquor for further processing or disposal.

In yet another embodiment of the process of the present invention, the sulfide addition step may be eliminated and replaced by an ion exchange step to remove metals, including toxic metals and radionuclides from the cleaning solution. The ion exchange step can be carried either before the EDTA precipitation step or after. An ion exchange step could also be used in addition to a sulfide addition step to insure that the solution is substantially free from potentially hazardous metals.

The chelating/complexing agent recovery process is illustrated by the following Example, which is not intended to be limiting.

EXAMPLE

Iron solvent produced by the EPRI/SGOG steam generator cleaning process described above was processed as follows in accordance with the present invention to recover the EDTA instead of destroying it with hydrogen peroxide, which would have been done prior to disposal. Instead, in accordance with the present invention, EDTA was selectively precipitated as acid EDTA, and the remaining acid soluble metals were treated with hydrogen peroxide and sodium hydroxide to form metal precipitates.

3 3. volume % sulfuric acid ($H_2SO_4$) was added to the iron solvent resulting from the chemical cleaning of a steam generator to produce a pH of 1 in the solution. The solution was agitated, and within one hour after the agitation was stopped, large, heavy EDTA precipitate particles were formed, settling at a rate in excess of 99.9%. The EDTA precipitate was 15% of the original iron solvent volume. The EDTA precipitate was separated from the solution, and the pH of the solution was adjusted to 7 by adding 2.5 volume % of 50% sodium hydroxide (NaOH). Residual EDTA in the solution prevented the formation of an iron hydroxide precipitate. 10 volume % of a 50% hydrogen peroxide ($H_2O_2$) solution was also added, although pigmentations requirements may dictate the addition of less $H_2O_2$.

At pH 1.0, 9.62% EDTA was recovered, and 0.03% EDTA remained in solution.

The treated solvent contained the following major constituents:

| | |
|---|---|
| TOC (Total Organics Concentration) | 0.178% |
| Ammonia ($NH_3$) | 1.64% |
| Sodium ($Na^+$) | 1.06% |
| Sulfate ($SO_4^{-2}$) | 5.94% |

Removing more than 98% of the EDTA content rather than destroying the EDTA complex as was previously done affects the ion processing medium requirements. Total charcoal requirements are reduced. Although the anion and cation exchange resins are required to remove additional sodium and sulfate ions, the reduction in total organics increases the anion resin capacity significantly and the cation resin capacity to a lesser extent.

The cost savings which can be realized from the use of the process of the present invention are potentially very substantial. The volume of a typical EDTA cleaning solution is in excess of 50,000 gallons. The EDTA concentration of this cleaning solution is usually about 12 percent, which amounts to about 68,000 pounds of sodium EDTA required to make the cleaning solution. The current cost of this quantity of sodium EDTA is about $80,000. Consequently, the ability to recover and reuse a substantial portion of the EDTA provided by the present invention will result in a major savings in cost of the cleaning process. Moreover, additional costs savings will result from the minimization of waste stream volume possible with the reuse of EDTA.

The process of the present invention has been described with respect to its application to recovering EDTA from solutions produced by cleaning processes for steam generators. However, it is anticipated that the present process of recovering a chelating/complexing agent from a metal and chelating/complexing agent-containing solution can be used in connection with other processes in which it is desired to separate and recover a chelating/complexing agent from a similar metal and chelating/complexing agent-containing solution.

I claim:

1. A process for treating a radionuclide contaminated aqueous stream containing a chelating agent and metal ions that has been used to chemically clean a component in a nuclear power plant, including the steps of:

(1) adjusting the pH of the stream to a pH less than 2.0 to precipitate acid chelate from said stream;

(2) recovering the acid chelate precipitate from the stream;

(3) adjusting the pH of the stream to 7;

(4) adding sulfide ions to the stream to form insoluble metal sulfides with the metal ions;

(5) separating the insoluble metal sulfides formed in step (4) from the stream to produce a clear liquor; and (6) further processing said clear liquor so that said clear liquor is suitable for environmental disposal.

2. The process described in claim 1, wherein said stream is chilled to a temperature at which said acid chelate is substantially insoluble during step (1).

3. The process described in claim 1, wherein said metal ions include one or more metal ions selected from the group consisting of ions of toxic metals and ions of radionuclides.

4. The process described in claim 1, wherein in step (1) said pH is adjusted to less than 2.0 by the addition of an acid selected from the group consisting of $H_2SO_4$, HCl, $H_3PO_4$ and $HNO_3$.

5. The process described in claim 1, wherein said chelating agent is ethylenediaminetetraacetic acid.

6. A process for treating a radionuclide contaminated aqueous waste solution containing EDTA and metal ions including the sequential steps of:

(1) adjusting the pH of the waste solution to a pH sufficiently low to precipitate acid EDTA form said waste solution;

(2) recovering the acid EDTA precipitate form the waste solution to produce a clear liquor;

(3) adjusting the pH of the clear liquor to 7;

(4) adding substantially exclusively sulfide ions to the waste stream solution to form insoluble metal sulfides with the metal ions;

(5) separating the insoluble metal sulfides formed in the step (4) form the clear liquor to produce a final liquor; and (6) further processing said final liquor so that said final liquor is suitable for environmental disposal.

7. A process of treating a radionuclide contaminated aqueous waste solution containing EDTA and metal ions including the steps of:

(1) adjusting the pH of the waste solution to a pH less than 2.0 to precipitate acid EDTA from said solution;

(2) recovering the acid EDTA from waste solution to produce a clear liquor;

(3) adjusting the pH of the clear liquor to 7;

(4) removing the metal ions form the waste solution, and (5) further processing said liquor so that said final liquor is suitable for environmental disposal.

8. The process for recovering EDTA described in claim 7, wherein the waste stream is chilled during step (1) to a temperature of about 32° F. (0° C.).

9. The process for recovering EDTA described in claim 7, wherein said metal ions are selected from the group consisting of ions of toxic metals and ions of radionuclides.

10. The process for recovering EDTA described in claim 7, wherein in step (1) the pH is adjusted to a pH within the range of 0.5 to 2.0 by the addition of an acid selected from the group consisting of $H_2SO_4$, HCl, $H_3PO_4$ and $HNO_3$.

11. A process for recovering ethylenediaminetetraacetic acid (EDTA) from the waste water produced by the EDTA chemical decontamination of a nuclear powered stream generator including the steps of:

(1) adding substantially only sulfide ions to the waste water to remove metals and radionuclides from the waste water forming insoluble metal sulfides and a substantially metal and radionuclide-free liquor;

(2) adjusting the pH of said liquor to a pH of less than 2.0, thereby causing the EDTA to precipitate out of said liquor as acid EDTA;

(3) separating the acid EDTA precipitate from the liquor to form a final liquor and to recover the acid EDTA;

(4) adjusting the pH of the said final liquor to 7; and (5) further processing said final liquor so that said final liquor is suitable for environmental disposal.

12. The process for recovering EDTA described in claim 11, wherein the metal and radionuclide-free liquor is chilled during step (2) to a temperature of about 32° F. (0° C.).

13. The process for recovering EDTA described in claim 12, wherein during step (2) said pH is adjusted to about 0.5 to 2.0 by the addition of an acid selected form the group consisting of $H_2SO_4$, HCl, $H_3PO_4$ and $HNO_3$.

* * * * *